W. J. SNOW.
CHURN.
APPLICATION FILED SEPT. 12, 1908.
913,573.
Patented Feb. 23, 1909.
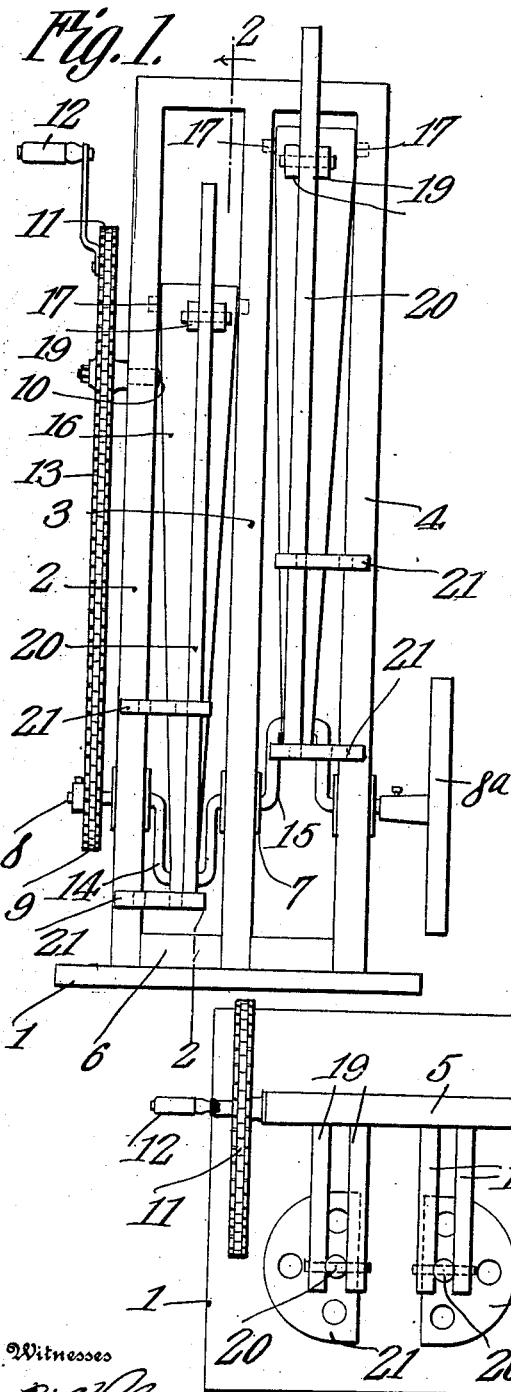
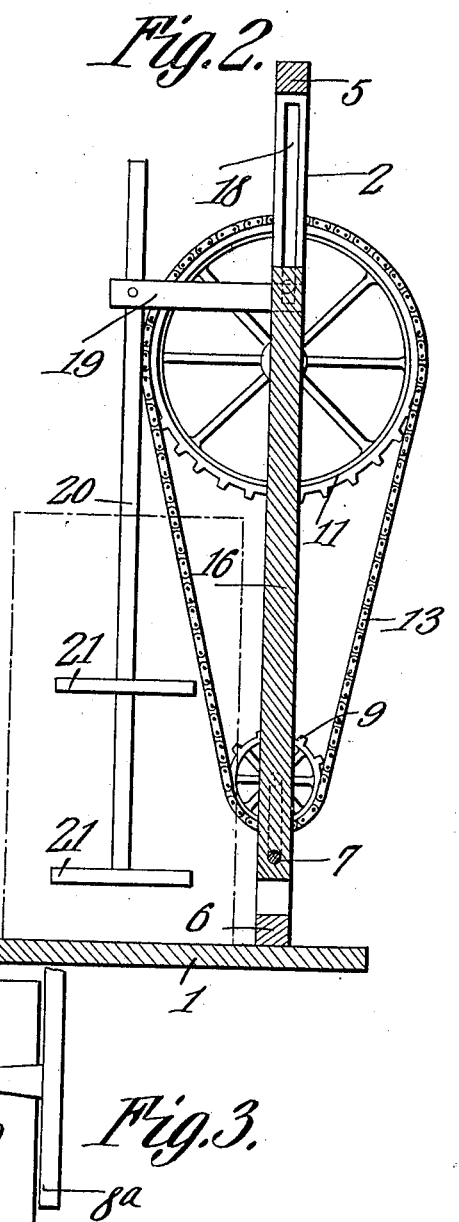
Fig. 1.
Fig. 2.
Fig. 3.
Witnesses
Inventor
William J. Snow.
By C. A. Snow & Co.
Attorneys
THE NORRIS PETERS CO., WASHINGTON, D. C.

UNITED STATES PATENT OFFICE.

WILLIAM J. SNOW, OF VILONIA, ARKANSAS, ASSIGNOR OF ONE-HALF TO ZEB D. MORGAN, OF VILONIA, ARKANSAS.

CHURN.

No. 913,573. Specification of Letters Patent. Patented Feb. 23, 1909.

Application filed September 12, 1908. Serial No. 452,771.

*To all whom it may concern:*

Be it known that I, WILLIAM J. SNOW, a citizen of the United States, residing at Vilonia, in the county of Faulkner and State of Arkansas, have invented a new and useful Churn, of which the following is a specification.

This invention relates to churns, and has for its object to provide a device of this character which shall be simple, efficient and economical, and capable of producing a large quantity of butter in a very short time.

To this end the invention consists of the combination and arrangement of parts hereinafter described and claimed and illustrated in the accompanying drawing, in which:—

Figure 1 is an elevation of the improved churn; Fig. 2, a vertical sectional view on the line 2—2 of Fig. 1; and Fig. 3, a top plan view of the device.

Similar characters are used for the same parts in all the figures.

In the drawing, 1 indicates a base of desirable size and shape, from which three uprights 2, 3 and 4, parallel to one another, rise to a suitable height and are there connected by a horizontal cross piece 5. Cross pieces 6 and 7 are inserted between the uprights at the base to strengthen the attachment of the uprights to said base.

Near the bottom of the uprights 2, 3 and 4 are placed bearings to receive a double cranked horizontal shaft 8 with straight ends extending beyond the outside uprights 2 and 4, on one of which shaft ends is mounted a fly wheel 8ª and on the other end is fastened a small sprocket wheel 9. Toward the top of the upright 2 is fastened a short stud shaft 10 carrying a large sprocket 11 provided with a hand crank 12 by means of which the sprocket wheel is turned. Connecting the sprocket wheels 9 and 11 is placed a chain 13 which rotates the crank shaft 8 when the hand crank 12 is revolved.

The two cranks 14 and 15 on the crank shaft 8 are disposed at an angle of one hundred and eighty degrees, or directly opposite each other and placed, one crank 14 between the outer and inner uprights 2 and 3 respectively and the other crank 15 between the same inner upright and the other outer upright 4. Pivoted on each crank is a vertical connecting bar or slide 16 reaching almost to the cross piece 5 when a crank is in its highest position. Pins or lugs 17 project from each edge of the connecting bars or slides near their upper ends, and enter vertical grooves 18 therein which direct the movement of said upper end of the slides.

Projecting perpendicularly from the front side of each connecting bar or slide 16 are a pair of parallel arms 19, pivotally connected to a churn dasher rod 20 which dasher rod hangs downwardly nearly to the base 1 in its lowermost position. Each dasher rod carries two semi-circular dasher plates 21 separated from each other and having their straight edges facing inwardly. With this churn, any type of cream receptacle may be used as the upper dasher is adjustably fastened to the dasher rod.

When the handle is turned it gives motion through the chain to the crank axle, the cranks of which by their alternate rise, raise and lower the connecting rods and the dashers suspended therefrom, thoroughly agitating the cream and quickly separating the butter therefrom.

What is claimed is:—

A churn operating mechanism comprising a base, end standards and an intermediate standard rising therefrom, the opposite faces of said standards being grooved at their upper ends, a shaft journaled in the standards, and formed with a pair of cranks working respectively between one of the end standards and the intermediate standard, a pitman connected to each crank and extending upwardly therefrom, pins projecting from opposite sides of each pitman and sliding respectively in the grooves of one of the end standards and the intermediate standard, an arm projecting outwardly from each pitman, and a dasher shaft pivotally connected to each arm.

In testimony that I claim the foregoing as my own, I have hereto affixed my signature in the presence of two witnesses.

WILLIAM J. SNOW.

Witnesses:
ARCH SEVIER,
W. B. JAMES.